(12) United States Patent
Tzannes

(10) Patent No.: US 8,937,988 B2
(45) Date of Patent: Jan. 20, 2015

(54) SYSTEMS AND METHODS FOR A MULTICARRIER MODULATION SYSTEM WITH A VARIABLE MARGIN

(71) Applicant: TQ Delta, LLC, Austin, TX (US)

(72) Inventor: Marcos C. Tzannes, Orinda, CA (US)

(73) Assignee: TQ Delta, LLC, Austin, TX (US)

( * ) Notice: Subject to any disclaimer, the term of this patent is extended or adjusted under 35 U.S.C. 154(b) by 0 days.

(21) Appl. No.: 14/079,285

(22) Filed: Nov. 13, 2013

(65) Prior Publication Data

US 2014/0072062 A1   Mar. 13, 2014

Related U.S. Application Data

(63) Continuation of application No. 13/764,529, filed on Feb. 11, 2013, now Pat. No. 8,625,660, which is a continuation of application No. 12/694,143, filed on Jan. 26, 2010, now Pat. No. 8,374,226, which is a (Continued)

(51) Int. Cl.
*H04B 1/38* (2006.01)
*H04L 27/28* (2006.01)
*H04L 27/26* (2006.01)
*H04L 5/00* (2006.01)

(52) U.S. Cl.
CPC .......... *H04L 27/2601* (2013.01); *H04L 5/0007* (2013.01); *H04L 5/0044* (2013.01); *H04L 5/0046* (2013.01); *H04L 5/006* (2013.01); *H04L 27/2608* (2013.01); *H04B 1/38* (2013.01)
USPC .......................................... 375/222; 375/260

(58) Field of Classification Search
CPC ..... H04L 1/0002; H04L 1/1671; H04L 1/243; H04L 5/0007; H04L 5/0046; H04L 5/006; H04L 5/0044; H04L 5/14; H04L 27/2608; H04W 72/04; H04M 11/062
USPC ......... 375/222, 227, 259–260, 285, 295, 316, 375/350; 370/484–485

See application file for complete search history.

(56) References Cited

U.S. PATENT DOCUMENTS

| | | | |
|---|---|---|---|
| 3,839,599 A * | 10/1974 | Pitroda | 375/371 |
| 5,812,599 A | 9/1998 | Van Kerckhove | |
| 5,822,374 A | 10/1998 | Levin | |
| 6,084,906 A | 7/2000 | Kao et al. | |
| 6,205,410 B1 * | 3/2001 | Cai | 702/191 |
| 6,222,888 B1 | 4/2001 | Kao et al. | |
| 6,249,543 B1 | 6/2001 | Chow | |

(Continued)

FOREIGN PATENT DOCUMENTS

| | | |
|---|---|---|
| EP | 0812087 | 12/1997 |
| EP | 0918422 | 5/1999 |

(Continued)

OTHER PUBLICATIONS

U.S. Appl. No. 09/510,773, filed Feb. 23, 2000, Tzannes.

(Continued)

*Primary Examiner* — Khanh C Tran
(74) *Attorney, Agent, or Firm* — Jason H. Vick; Sheridan Ross, PC

(57) ABSTRACT

A multicarrier modem has a plurality of carriers over which data is transmitted. By assigning, foe example, one or more different margins to the individual carriers the data rate and impairment immunity can be increased.

24 Claims, 2 Drawing Sheets

Related U.S. Application Data continuation of application No. 11/972,340, filed on Jan. 10, 2008, now abandoned, which is a continuation of application No. 11/242,024, filed on Oct. 4, 2005, now abandoned, which is a continuation of application No. 09/836,295, filed on Apr. 18, 2001, now abandoned.

(60) Provisional application No. 60/197,727, filed on Apr. 18, 2000.

(56) References Cited

U.S. PATENT DOCUMENTS

| | | | |
|---|---|---|---|
| 6,266,348 B1 | 7/2001 | Gross et al. | |
| 6,278,728 B1* | 8/2001 | McHale et al. | 375/219 |
| 6,307,889 B1 | 10/2001 | Chun | |
| 6,510,184 B1 | 1/2003 | Okamura | |
| 6,516,027 B1* | 2/2003 | Kapoor et al. | 375/227 |
| 6,553,075 B1 | 4/2003 | McGhee et al. | |
| 6,650,697 B1 | 11/2003 | Tate et al. | |
| 6,870,888 B1* | 3/2005 | Shapiro et al. | 375/260 |
| 7,184,467 B2* | 2/2007 | Jacobsen et al. | 375/222 |
| 8,374,226 B2 | 2/2013 | Tzannes | |
| 8,630,249 B2* | 1/2014 | Thyagarajan et al. | 370/329 |
| 2002/0009155 A1 | 1/2002 | Tzannes | |
| 2003/0123560 A1* | 7/2003 | Jacobsen et al. | 375/260 |
| 2004/0240464 A1* | 12/2004 | Fite | 370/438 |
| 2006/0018395 A1 | 1/2006 | Tzannes | |
| 2008/0107204 A1 | 5/2008 | Tzannes | |
| 2012/0219047 A1 | 8/2012 | Tzannes | |
| 2013/0148708 A1 | 6/2013 | Tzannes | |

FOREIGN PATENT DOCUMENTS

| | | |
|---|---|---|
| EP | 0955744 | 11/1999 |
| JP | 2000-031936 | 1/2000 |
| JP | 2000-078105 | 3/2000 |
| JP | 2002-504283 | 2/2002 |
| WO | WO 98/11845 | 3/1998 |
| WO | WO 98/57472 | 12/1998 |
| WO | WO 99/20027 | 4/1999 |

OTHER PUBLICATIONS

"ITU-T Recommendation G.992.1" International Telecommunication Union, Jun. 1999, 256 pages.
"ITU-T Recommendation G.992.2" International Telecommunication Union, Jun. 1999, 179 pages.
"Spectrum Management for Loop Transmission Systems," ANSI Draft, 1999, pp. 1-110, XP-002178517.
"T1.413 Issue 2", American National Standards Institute (ANSI), Nov. 30-Dec. 4, 1998, 270 pages.
Cioffi, John M., ADSL Maintenance with DMT, T1E1.4 ADSL Project, Amati Communications Corporation, Dec. 1, 1992, pp. 1-14.
Colin et al. "QoS Considerations for DMT-based ADSL and VDSL Systems" IEEE International Conference on Acoustics, Speech and Signal Processing, May 12-15, 1998, pp. 3437-3440, XP000951196.
International Search Report for International (PCT) Patent Application No. PCT/US01/12555, mailed Oct. 9, 2001.
International Preliminary Examination Report for International (PCT) Patent Application No. PCT/US01/12555, mailed Aug. 14, 2002.
Examiner's First Report for Australian Patent Application No. 2001257081, mailed May 6, 2005.
Examiner's First Report for Australian Patent Application No. 2007200448, dated Aug. 22, 2007.
Notice of Acceptance for Australian Patent Application No. 2007200448, mailed Apr. 1, 2009.
Examiner's First Report for Australian Patent Application No. 2009202880, dated Nov. 30, 2010.
Official Action for Canadian Patent Application No. 2,406,151, mailed Jan. 10, 2008.
Notice of Allowance for Canadian Patent Application No. 2,406,151, mailed Jul. 15, 2009.
Official Action for European Patent Application No. 01930554.9, dated Mar. 5, 2003.
Official Action for European Patent Application No. 01930554.9, dated Nov. 18, 2003.
Official Action for European Patent Application No. 01930554,9, dated Jul. 13, 2004.
Official Action for European Patent Application No. 01930554.9, dated Sep. 8, 2005.
Communication under Rule 71(3) EPC for European Patent Application No. 01930554.9, dated Oct. 4, 2006.
Partial European Search Report for European Patent Application No. 07005676, completed Aug. 24, 2007.
Official Communication for European Patent Application No. 07005676,7, mailed May 2, 2008.
Communication under Rule 71(3) EPC for European Patent Application No. 07005676.7, dated Jan. 28, 2011.
Decision to Grant a European Patent Pursuant to Article 97(1) EPC for European Patent Application No. 07005676.7, mailed May 19, 2011.
Partial European Search Report for European Patent Application No. 10011998.1, dated Nov. 19, 2010.
Official Action for European Patent Application No. 10011998.1, mailed Feb. 8, 2011.
Official Action for Japanese Patent Application No. 2001-576639, mailed Jan. 24, 2011.
Decision of Final Rejection for Japanese Patent Application No. 2001-576639, mailed Sep. 5, 2011.
Preliminary Rejection for Korean Patent Application No. 2002-7013983, issued Apr. 25, 2007.
Notice of Refusal for Korean Patent Application No. 2002-7013983, issued Feb. 28, 2011.
Official Action for U.S. Appl. No. 09/836,295, mailed Jul. 22, 2004.
Official Action for U.S. Appl. No. 09/836,295, mailed Apr. 4, 2005.
Official Action for U.S. Appl. No. 11/242,024, mailed Jul. 11, 2007.
Official Action for U.S. Appl. No. 11/972,340, mailed Jun. 18, 2008.
Official Action for U.S. Appl. No. 11/972,340, mailed Mar. 5, 2009.
Official Action for U.S. Appl. No. 11/972,340, mailed Sep. 10, 2009.
Official Action for U.S. Appl. No. 11/972,340, mailed Mar. 25, 2010.
Official Action for U.S. Appl. No. 11/972,340, mailed Jun. 11, 2010.
Official Action for U.S. Appl. No. 11/972,340, mailed Nov. 5, 2010.
Official Action for U.S. Appl. No. 12/694,143, mailed Jun. 14, 2011.
Official Action for U.S. Appl. No. 12/694,143, mailed Nov. 3, 2011.
Notice of Allowance for U.S. Appl. No. 12/694,143, mailed Dec. 10, 2012.
Official Action for U.S. Appl. No. 13/467,392, mailed Mar. 18, 2013.
Official Action for U.S. Appl. No. 13/764,529, mailed Apr. 11, 2013.
Notice of Allowance for U.S. Appl. No. 13/764,529, mailed Oct. 17, 2013.

* cited by examiner

SYSTEMS AND METHODS FOR A MULTICARRIER MODULATION SYSTEM WITH A VARIABLE MARGIN

RELATED APPLICATION DATA

This application is a continuation of U.S. application Ser. No. 13/764,529, filed Feb. 11, 2013, now U.S. Pat. No. 8,625,660, which is a Continuation of U.S. application Ser. No. 12/694,143, filed Jan. 26, 2010, now U.S. Pat. No. 8,374,226, which is a continuation of U.S. application Ser. No. 11/972,340, filed Jan. 10, 2008, which is a continuation of U.S. application Ser. No. 11/242,024, filed Oct. 4, 2005, which is a continuation of U.S. application Ser. No. 09/836,295, filed Apr. 18, 2001, which claims the benefit of and priority under 35 U.S.C. §119(e) to U.S. Provisional Application No. 60/197,727, entitled "Multicarrier modulation system with variable margin to account for time varying impairments," filed Apr. 18, 2000, each of which are incorporated herein by reference in their entirety.

BACKGROUND OF THE INVENTION

1. Field of the Invention

This invention relates to communications technologies. In particular, this invention relates to multicarrier modulation systems having multiple margins.

2. Description of Related Art

Multicarrier modulation, or Discrete Multitone Modulation (DMT), is a transmission method that is widely used for communication over difficult media. Multicarrier modulation divides the transmission frequency band into multiple subchannels, i.e., carriers or bins, with each carrier individually modulating a bit or a collection of bits. A transmitter modulates an input data stream containing information bits with one or more carriers, i.e., bins or subchannels, and transmits the modulated information. A receiver demodulates all the carriers in order to recover the transmitted information bits as an output data stream.

Multicarrier modulation has many advantages over single carrier modulation. These advantages include, for example, a higher immunity to impulse noise, a lower complexity equalization requirement in the presence of multipath, a higher immunity to narrow band interference, a higher data rate and bandwidth flexibility. Multicarrier modulation is being used in many applications to obtain these advantages, as well as for other reasons. These applications include Asymmetric Digital Subscriber Line (ADSL) systems, wireless LAN systems, power line communications systems, and other applications. ITU standards G.992.1 and G.992.2 and the ANSI T1.413 standard specify standard implementations for ADSL transceivers that use multicarrier modulation.

Discrete multitone modulation transceivers modulate a number of bits on each subchannel, the number of bits depending on the Signal to Noise Ratio (SNR) of that subchannel and the Bit Error Rate (BER) requirement of a link. For example, if the required BER is $1\times10^{-7}$, i.e., one bit in ten million is received in error on average, and the SNR of a particular subchannel is 21.5 dB, then that subchannel can modulate 4 bits, since 21.5 dB is the required SNR to transmit 4 QAM bits with a $1\times10^{-7}$ BER. Other subchannels can have a different SNR and therefore may have a different number of bits allocated to them at the same BER. Additional information regarding bit loading can be found in copending U.S. application Ser. No. 09/510,773, incorporated herein by reference in its entirety.

In many DMT systems, an additional parameter is used to determine the number of bits allocated to each subchannel. This parameter is called the SNR "margin," or simply the "margin." The margin specifies an extra SNR per subchannel, in addition to what is required to maintain the specified BER requirement. As an example, a DMT system with a 6 dB margin would require a 21.5+6=27.5 dB SNR on a subchannel in order to transmit 4 bits on that subchannel with a $1\times10^{-7}$ BER. This is 6 dB more than required by the example in the previous paragraph because now a 6 dB margin is added to the system. Another way of looking at this is that in the example of the previous paragraph, where 4 bits were allocated to a subchannel with 21.5 dB SNR, the margin was 0 dB.

DMT transceivers use a margin to increase the system's immunity to various types of time varying impairments. Examples of these impairments in DSL systems are: changes in the levels of crosstalk from other transmission systems, impulse noise, temperature changes in the telephone line, or the like. When a DMT system is operating with a positive SNR margin, the noise can change instantaneously by the level of the margin and the system will still maintain the required BER. For example, if the system is operating at a 6 dB margin, e.g., 4 bits are allocated to carriers with 27.5 dB SNR for BER=$1\times10^{-7}$, the crosstalk levels can increase by 6 dB and the system will still be operating at the required $1\times10^{-7}$ BER. Obviously the penalty for this increase in robustness is a decrease in the data rate, since with a 0 dB margin, a subchannel with 27.5 dB SNR can modulate 6 bits at $1\times10^{-7}$ BER.

Therefore, there is a tradeoff between the robustness of the channel, such as a phone line, and the achievable data rate. The margin can be used to quantify this tradeoff. A higher margin results in a higher level of immunity to changing channel conditions at the expense of the achievable data rate. Likewise, a lower margin results in a higher data rate at the expense of a lower immunity to changing channel conditions.

Current DMT systems allocate a fixed margin to all subchannels. For example, ADSL systems typically use a 6 dB margin on all subchannels carrying data bits. This 6 dB margin is constant on all subchannels and is independent of the type of impairment that the margin is trying to protect against.

SUMMARY OF THE INVENTION

For simplicity of reference, the systems and methods of this invention will hereinafter refer to the transceivers, or multicarrier modems, generically as modems. One such modem is typically located at a customer premises such as a home or business and is "downstream" from a central office with which it communicates. The other modem is typically located at the central office and is "upstream" from the customer premises. Consistent with industry practice, the modems are often referred to as "ATU-R" ("ADSL transceiver unit, remote," i.e., located at the customer premises) and "ATU-C" ("ADSL transceiver unit, central office," i.e., located at the central office). Each modem includes a transmitter section for transmitting data and a receiver section for receiving data, and is of the discrete multitone type, i.e., the modem transmits data over a multiplicity of subchannels of limited bandwidth. Typically, the upstream or ATU-C modem transmits data to the downstream or ATU-R modem over a first set of subchannels, which are usually the higher-frequency subchannels, and receives data from the downstream or ATU-R modem over a second, usually smaller, set of subchannels, commonly the lower-frequency subchannels.

For example, in digital subscriber line (DSL) technology, communications over a local subscriber loop between a central office and a subscriber premises is accomplished by modulating the data to be transmitted onto a multiplicity of discrete frequency carriers which are summed together and then transmitted over a subscriber loop. Individually, the carriers form discrete, non-overlapping communication subchannels which are of a limited bandwidth. Collectively, the carriers form what is effectively a broadband communications channel. At the receiver end, the carriers are demodulated and the data recovered.

DSL systems experience disturbances from other data services on adjacent phone lines, such as, for example, ADSL, HDSL, ISDN, T1, or the like. Additionally, DSL systems may experience disturbances from impulse noise, crosstalk, temperature changes, or the like. These disturbances may commence after the subject DSL service is already initiated and, since DSL for Internet access in envisioned as a always-on service, the affects of these disturbances should be considered by the subject DSL transceiver. Additionally, the length of the phone line is a type of impairment that varies from one ADSL subscriber to another, i.e. from one ADSL installation to another, and therefore has an effect on the ADSL modem performance.

The systems and methods of this invention allow the margin in a discrete multitone modulation system to vary depending on a type of impairment. For example, this impairment can be changing over some duration or from one installation to another. Thus, different margins can be assigned to one or more of the carriers in a discrete multitone modulation communication system.

As noted above, there is a tradeoff between the robustness of the link and the achievable data rate. By setting a higher margin, a higher level of immunity to changing channel conditions is achieved at the expense of the data rate. Similarly, while a lower margin may result in a higher data rate, the immunity to changing channel conditions is reduced.

However, setting the margin equally for all subchannels at least fails to account for impairments that change over time and how the impairments may have different effects on subchannels at different frequencies. For example, temperature changes and line length effect different frequencies with differing degrees of interference.

Aspects of the present invention relate to a communications system having a plurality of margins.

Aspects of the present invention also relates to a method of assigning a plurality of margins to a communications system.

Aspects of this present invention additionally relate to multicarrier modulation systems and methods for different margins to be assigned to different subchannels to account for varying impairments.

These and other features and advantages of this invention are described in, or are apparent from, the following detailed description of the embodiments.

BRIEF DESCRIPTION OF THE DRAWINGS

The embodiments of the invention will be described in detail, with reference to the following figures wherein.

DETAILED DESCRIPTION OF THE INVENTION

Figure 1:
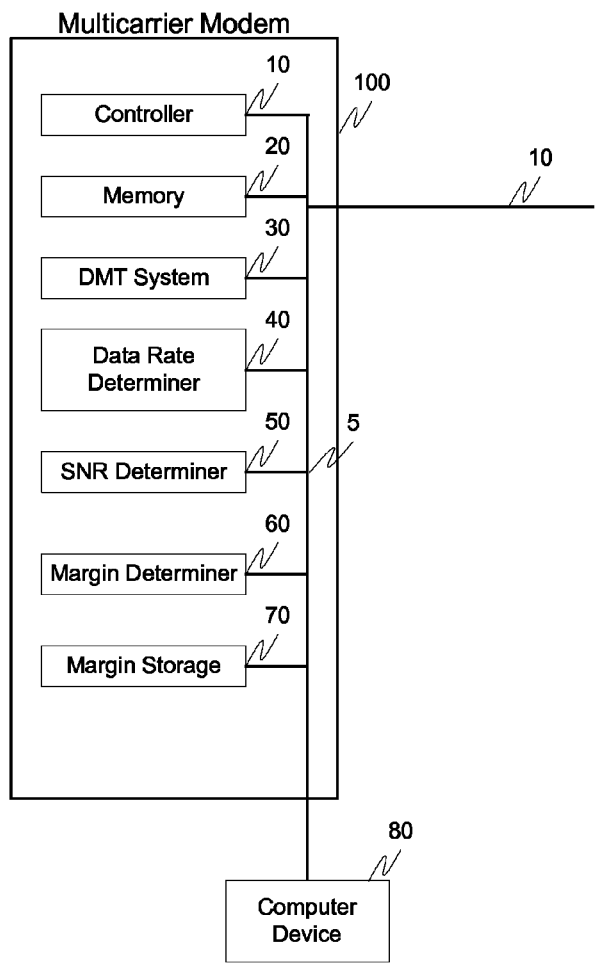
FIG. 1 is a functional block diagram illustrating an exemplary modem according to this invention.

In an exemplary embodiment of the invention, the margin is set to be different on at least two subchannels in a discrete multitone modulation system. In this exemplary embodiment, subchannels which are expected to incur greater variations in impairment levels are set to have a higher margin, whereas subchannels which are expected to incur lower variations in impairment levels are set to have lower margins. As an example of this embodiment, consider an ADSL transmission system transmitting data over telephone wires and consider the case where the impairment is changing channel conditions due to temperature fluctuations. Since telephone wire is typically made out of copper, the attenuation, i.e., the insertion loss, characteristics will depend on the temperature of the wire. As the temperature of the wire increases, the attenuation, i.e., the insertion loss, will increase. Furthermore, the insertion loss also varies with frequency as the temperature changes. Therefore, as the temperature increases, in addition to an overall increase in insertion loss, the insertion loss at the higher frequencies increases more than the insertion loss at the lower frequencies. Table 1 shows a correlation of frequency versus insertion loss of an exemplary 13,500 ft. 26 AWG line at various frequencies for 70° F. and 120° F.

TABLE 1

Insertion loss of 13500 ft 26 AWG line versus frequency at 70 F. and 120 F.

| | Frequency (kHz) | | | | | | | | | | |
|---|---|---|---|---|---|---|---|---|---|---|---|
| | 20 | 40 | 100 | 200 | 260 | 300 | 400 | 500 | 600 | 780 | 1100 |
| Insertion loss (dB) at 70° F | 29.8 | 36.7 | 45.2 | 52.8 | 57.3 | 60.2 | 67.7 | 74.8 | 81.7 | 93.0 | 110 |
| Insertion loss (dB) at 120° F | 31.9 | 39.6 | 49.4 | 57.4 | 61.8 | 64.8 | 72.3 | 79.3 | 86.1 | 97.9 | 116 |

From Table 1, it is apparent that the difference in insertion loss from 120° F. to 70° F. is 2.1 dB at 20 kHz, whereas the difference in insertion loss from 120° F. to 70° F. is 6 dB at 1100 kHz. For this exemplary embodiment, a higher margin could be allocated to carriers at higher frequencies and a lower margin allocated to carriers at lower frequencies. For example, the carrier at 20 kHz will only need a 2.1 dB margin, because even if the temperature changes from 70° F. to 120° F., the insertion loss will only change by 2.1 dB and, as a result, the system bit error rate requirement can still be met after the temperature change. Similarly, the carrier at 1100 kHz will need a 6 dB margin, since as the temperature changes from 70° F. to 120° F., the insertion loss will change by 6 dB and, as a result, the system bit error rate requirement will still be satisfied even after the temperature change.

However, it is to be appreciated that the margin is not allocated to each subchannel in a fixed manner, but rather varies based on the expected change in impairments over time or as impairments vary from one DSL installation to another. However, that does not preclude the possibility that different subchannels can have the same margin assigned to them. For example, a subchannel may have a certain margin assigned based on a particular impairment, while another subchannel may have the same margin assigned based on another impairment. These impairments can include, but are not limited to, changes in the levels of crosstalk from other transmission systems, impulse noise, temperature changes, line length, radio frequency interference and other ingress, or the like. As a result, for example, since certain subchannels are not overly burdened with a common margin, the overall data rate of the system can be increased without sacrificing the robustness of the system.

For example, and with reference to Table 1, by lowering the margin of the lower carriers from 6 dB to 2.1 dB, the channel data rate has increased. This increase can occur without a loss of the immunity to temperature variations on the line since the lower frequencies are less susceptible to temperature changes than the higher frequencies. In general, the systems and methods of this invention can be adapted to set a margin for any impairment that varies over time, or is installation based, and may, for example, effect different frequencies in different ways.

As another example, consider crosstalk from another transmission system. If the crosstalking transmission system is known to use only a portion of the frequency spectrum utilized by the discrete multitone modulation system, then the margins can be decreased on the carriers that are known to be outside the frequency spectrum of the crosstalking system. For example, ISDN systems are an example of a crosstalk source for ADSL systems. ISDN systems typically transmit only up to approximately 150 kHz. Thus, for example, employing the teachings of this invention, carriers above 150 kHz can operate at lower margins than carriers below 150 kHz where the ISDN crosstalk is present.

As another example, the margin in an ADSL system can be varied depending on the length of the telephone wire. Table 2 shows a relationship of insertion loss of an exemplary 9000 ft. 26 AWG line at frequencies for 70° F. and 120° F.

TABLE 2

Insertion loss of 9000 ft 26 AWG line versus frequency at 70 F. and 120 F.

| | Frequency (kHz) | | | | | | | | | | |
|---|---|---|---|---|---|---|---|---|---|---|---|
| | 20 | 40 | 100 | 200 | 260 | 300 | 400 | 500 | 600 | 780 | 1100 |
| Insertion loss (dB) at 70° F | 20.0 | 24.4 | 30.1 | 35.2 | 38.2 | 40.2 | 45.1 | 49.9 | 54.4 | 62.0 | 73.6 |
| Insertion loss (dB) at 120° F | 21.4 | 26.3 | 32.8 | 38.2 | 41.2 | 43.2 | 48.2 | 52.9 | 57.4 | 65.3 | 77.5 |

Comparing Table 1 and Table 2, it is apparent that an increase in insertion loss as temperature increases depends on the length of the telephone line as well. Thus, on the exemplary 9,000 ft. phone line, a 50° F. temperature change results in an average of only 2.8 dB increase in insertion loss. On the 13,500 ft. phone line, a 50° F. temperature change resulted in an average of 4.3 dB increase in insertion loss. For this illustrative example, the margin on the subchannels is varied depending on the length of the phone line. As an example, if the phone line is shorter, e.g., 9,000 ft., the average margin can be decreased on the subchannels by 4.3−2.8=1.5 dB as compared to a longer 13,500 ft. loop without sacrificing immunity to temperature changes on the phone line. This is possible because a shorter phone line will not experience as much of a change in insertion loss due to temperature changes as a longer phone line.

For this illustrative example, the margin allocated to different subchannels takes into account information about the length of the telephone line. As an example, the insertion loss difference from 70° F. to 120° F. at 20 kHz is 2.1 dB for the 13,500 ft. line. On the other hand, the insertion loss difference from 70° F. to 120° F. at 20 kHz is 1.4 dB for the 9,000 ft. line. Therefore, for this exemplary situation, a margin of 2.1 dB would be allocated to the carrier at 20 kHz on a 13,500 ft. line whereas a margin of 1.4 dB would be allocated to the carrier at 20 kHz on the 9,000 ft. line. The immunity to temperature variations on the line would be the same for both the systems operating at 9,000 ft. and 13,500 ft. As a result, the overall system data rate can be increased on shorter lines without sacrificing a loss in robustness.

FIG. 1 illustrates an exemplary embodiment of a multicarrier modem 100. In particular, the multicarrier modem 100 comprises a controller 10, a memory 20, a discrete multitone modulation system 30, a data rate determiner 40, a signal to noise ratio determiner 50, a margin determiner 60 and a margin storage 70, all interconnected by link 5. The multicarrier modem 100 is also connected to one or more computer or computer-type devices 80 and additional modems (not shown) via communications link 10. For ease of illustration, the multicarrier modem 100 has been illustrated in block diagram format with only the components needed for the exemplary embodiment of this invention. Additional information and further discussion of the operation and structure of an exemplary multicarrier modem can be found in copending U.S. patent application Ser. No. 09/485,614 entitled "Splitterless Multicarrier Modem."

While the exemplary embodiment illustrated in FIG. 1 shows the multicarrier modem 100 and various components collocated, it is to be appreciated that the various components of the multicarrier modem can be rearranged and located in whole or in part at an ATU-R and/or ATU-C. Furthermore, it is to be appreciated, that the components of the multicarrier modem 100 can be located at various locations within a distributed network, such as a POTS network, or other comparable telecommunications network. Thus, it should be appreciated, that the components of the multicarrier modem 100 can be combined into one device or distributed amongst a plurality of devices. As will be appreciated from the following description, and for reasons of computational efficiency, the components of the multicarrier modem can be arranged at any location within a telecommunications network and/or modem without affecting the operation of the system.

The links 5 and 10 can be a wired or a wireless link or any other known or later developed element(s) that is capable of supplying and communicating electronic data to and from the connected elements. Additionally, the computer device 80, can be, for example, a personal computer or other device. In general, the computer device 80 can be any device that uses a modem to transmit and/or receive data.

In operation, the multicarrier modem 100 is installed, for example, in a customer premises or in a central office. During this installation, certain fixed quantities such as line length are known and can be stored in the multicarrier modem 100. During an initial installation, or at any subsequent time for which a redetermination in margins is appropriate, for example, based on an increased bit error rate, changes in the signal to noise ratio, seasonal changes, or the like, the controller 10, in cooperation with the memory 20, the discrete multitone modulation system 30 and the margin determiner 60 can determine and store margins. For example, as illustrated above in exemplary Tables 1 and 2, margins can be determined for temperature fluctuations and the length of the wire line based on, for example, the actual installation and historical data. Furthermore, routines can be established by the margin determiner 60 to evaluate and compile statistical information relating to one or more carriers. For example, this statistical information can be compiled during modem idle times in response to impairments seen on the one or more carriers. This statistical information can then be used to determine appropriate margins for one or more carriers.

Alternatively the modem may measure the noise on the line during idle times and determine that a particular type of crosstalker, e.g., another ADSL or HDSL modem, is present. Since the spectral content of these types of crosstalkers are known, this information can be used to determine the margin. For example, if the crosstalker is an ATU-R ADSL modem then it is known that ATU-R ADSL modems transmit approximately in the 20-130 kHz range. This information can be used to determine the margin for the carriers in the 20-130 kHz frequency range.

Alternatively, a predetermined set of margins, for example, for known impairments, can be downloaded from, for example, a central office modem or other location within a communications network. The determined and/or downloaded margins are then stored in the margin storage 70. Similarly, groups of margins can be stored based on, for example, geographic information, seasonal information, line length information, or the like.

During training of the multicarrier modem 100, the SNR determiner 50, in cooperation with the controller 10, the memory 20, and the DMT system 30, determines the signal to noise ratio of the carriers. Knowing the signal to noise ratio of the carriers, the data rate determiner 40 determines the raw data rate of the carriers based on the signal to noise ratio and the bit error rate. This raw data rate reflects the data rate of carriers with no margin.

Generally, the bit error rate is set in advance, for example, by the manufacturer. Additionally, the data rate is generally governed by a range that is, for example, guaranteed as a maximum, by a DSL provider. Therefore, based on the set bit error rate, the signal to noise ratio for a known quantity of bits can be determined.

Knowing the signal to noise ratio, the margins for the carriers can be set, for example, based on one or more, or a combination of, entered criteria or determined criteria. For example, an entered criteria can be based on the loop length. A determined criteria can be, for example, based on standard temperature variance information that can, for example, be downloaded from the service provider. Alternatively, for example, the margins can be set based on historical data that relates to, for example, impairments on the line. In general, the margins can be set such that a balance between the data rate and the impairment immunity is maximized.

Having retrieved the margins for one or more of the carriers, the margins are set in the DMT system 30. The margins can then be subtracted from the carrier to determine an updated data rate for each carrier. Having set the margins, and knowing the data rate, the DMT system can then commence communication over the communications link 10.

Figure 2:
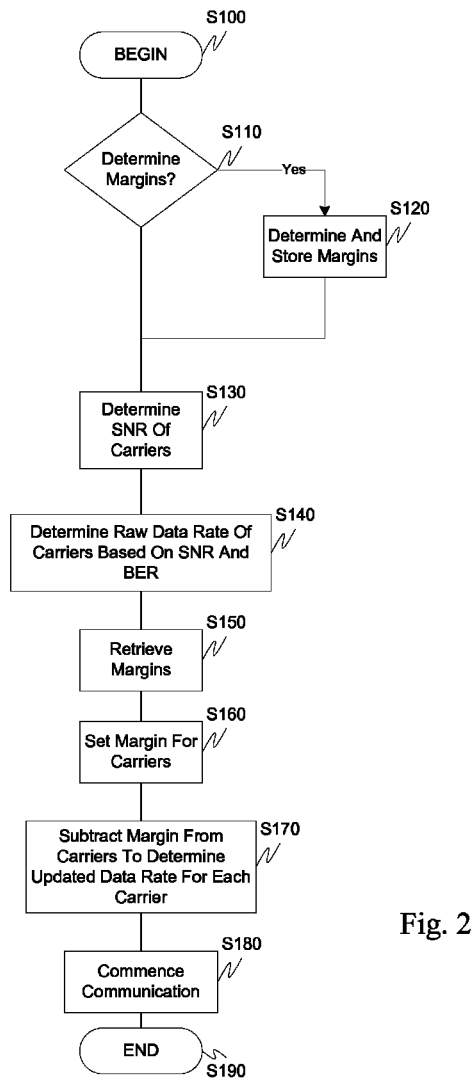
FIG. 2 is a flowchart outlining an exemplary method for assigning margins according to this invention.

FIG. 2 illustrates an exemplary method of assigning margins to carriers according to an exemplary embodiment of this invention. In particular, control begins in step S100 and continues to step S110. In step S110, a determination is made whether margins are to be determined. If margins are to be determined, control continues to step S120. Otherwise, control jumps to step S130.

In step S120, the margins are determined and stored. Control then continues to step S130.

In step S130, the signal to noise ratio of the carriers are determined. Next, in step S140, the raw data rate of the carriers is determined based on the signal to noise ratio and the bit error rate. Next, in step S150, the margins for the carriers are retrieved. Control then continues to step S160.

In step S160, the margins for the carriers are set. Next, in step S170, the margins are subtracted from the carriers to determine an updated data rate for each carrier. Control then continues to step S180.

In step S180, communications commence. Control then continues to step S190 where the control sequence ends.

However, it is to be appreciated that the steps in FIG. 2 need not occur in the order illustrated. For example, at any point in time there could be an option to re-determine the margins. Similarly, based on, for example, the time of the day, day, location, error rate, service provider directive, a change in the quality of service requirement, or the like, the margins could be adjusted. Alternatively, at any time, updated margins could be downloaded and stored in the margin storage. Alternatively, if it known that margins will be incorporated in the determination of the data rate, step S140 could be bypassed since it is known that the raw data rate will not be used.

Furthermore, the systems and methods of this invention can also apply to any multicarrier modulation based communication system including wireless LANs, such as wireless LAN 802.11 and ETSI Hyperlan standards, wireless access systems, home and access power-line communication systems, or the like.

As illustrated in FIG. 1, the multicarrier modem and related components can be implemented either on a DSL modem, or a separate program general purpose computer having a communications device. However, the multicarrier modem can also be implemented in a special purpose computer, a programmed microprocessor or microcontroller and peripheral integrated circuit element, and ASIC or other integrated circuit, a digital signal processor, a hardwired or electronic or logic circuit such as a discrete element circuit, a programmable logic device such as a PLD, PLA, FPGA, PAL, or the like, and associated communications equipment. In general, any device capable of implementing a finite state machine that is in turn capable of implementing the flowchart illustrated in FIG. 2 can be used to implement the multicarrier modem 100 according to this invention.

Furthermore, a disclosed method may be readily implemented in software using object or object-oriented software development environment that provides portable source code that can be used on a variety of computers, workstations, or modem hardware platforms. Alternatively, the disclosed modem may be implemented partially or fully in hardware using standard logic circuits or a VLSI design. Other software or hardware can be used to implement the systems in accordance with this invention depending on the speed and/or efficiency requirements of the systems, the particular function, and the particular software or hardware systems or microprocessor or microcomputer systems being utilized. The multicarrier modem illustrated herein, however, can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods can be readily implemented as software executed on a programmed general purpose computer, a special purpose computer, a microprocessor and associated communications equipment, or the like. In these instances, the methods and systems of this invention can be implemented as a program embedded on a modem, such as a DSL modem, or the like. The multicarrier modem can also be implemented by physically incorporating the system and method in a software and/or hardware system, such as a hardware and software system of a modem, such as an ADSL modem, or the like.

It is, therefore, apparent that there has been provided in accordance with the present invention, systems and methods for assigning margins to carriers. While this invention has been described in conjunction with a number of embodiments, it is evident that many alternatives, modifications and variations would be or are apparent to those of ordinary skill in the applicable art. Accordingly, Applicants intend to embrace all such alternatives, modifications, equivalents and variations that are within the spirit and the scope of this invention.

What is claimed is:

1. A multicarrier communications method, comprising:
    modulating for transmission, in a transceiver, a first plurality of bits onto a first carrier using a first Signal to Noise Ratio (SNR) margin;
    modulating for transmission, in the transceiver, a second plurality of bits onto a second carrier using a second Signal to Noise Ratio (SNR) margin; and
    modulating for transmission, in said transceiver, a third plurality of bits onto said first carrier using a third SNR margin,
    wherein the first SNR margin specifies a first value for an allowable increase in noise without an increase in the bit error rate (BER) associated with the first carrier,
    wherein the second SNR margin specifies a second value for an allowable increase in noise without an increase in the bit error rate (BER) associated with the second carrier,
    wherein the third SNR margin specifies a third value for an allowable increase in noise without an increase in the bit error rate (BER) associated with said first carrier,
    wherein the first SNR margin is different than the second SNR margin,
    wherein the first SNR margin is different than the third SNR margin, and
    wherein the first plurality of bits, the second plurality of bits and the third plurality of bits are each different from one another.

2. The method of claim 1, wherein at least one of the first, second and third SNR margins are further based on one or more of a change in temperature, a crosstalk from another transmission system, a length of a telephone wire, a radio frequency interference and an impulse noise.

3. The method of claim 1, wherein at least one of the first, second and third SNR margins are further based on one or more of an expected change in temperature, an expected crosstalk from another transmission system, a change in length of a telephone wire, an expected radio frequency interference and an expected impulse noise.

4. A method of communications, comprising:
    demodulating for reception, in a transceiver, a first plurality of bits from a first carrier using a first Signal to Noise Ratio (SNR) margin;
    demodulating for reception, in the transceiver, a second plurality of bits from a second carrier using a second SNR margin; and
    demodulating for reception, in the transceiver, a third plurality of bits from the first carrier using a third SNR margin,
    wherein the first SNR margin specifies a first value for an allowable increase in noise without an increase in the bit error rate (BER) associated with the first carrier,
    wherein the second SNR margin specifies a second value for an allowable increase in noise without an increase in the bit error rate (BER) associated with the second carrier,
    wherein the third SNR margin specifies a third value for an allowable increase in noise without an increase in the bit error rate (BER) associated with said first carrier,
    wherein the first SNR margin is different than the second SNR margin,
    wherein the first SNR margin is different than the third SNR margin, and
    wherein the first plurality of bits, the second plurality of bits and the third plurality of bits are each different from one another.

5. The method of claim 4, wherein at least one of the first SNR margin, the second SNR margin and the third SNR margins are based on one or more of a change in temperature, a crosstalk from another transmission system, a radio frequency interferer, a length of a telephone wire and an impulse noise.

6. The method of claim 4, wherein at least one of the first, second and third SNR margins are further based on one or more of an expected change in temperature, an expected crosstalk from another transmission system, a change in length of a telephone wire, an expected radio frequency interference and an expected impulse noise.

7. An apparatus comprising:
    a multicarrier communications transceiver operable to modulate for transmission a first plurality of bits onto a first carrier using a first Signal to Noise Ratio (SNR) margin and to modulate for transmission a second plurality of bits onto a second carrier using a second SNR margin, and to modulate for transmission a third plurality of bits onto the first carrier using a third SNR margin,
    wherein the first SNR margin specifies a first value for an allowable increase in noise without an increase in the bit error rate (BER) associated with the first carrier,
    wherein the second SNR margin specifies a second value for an allowable increase in noise without an increase in the bit error rate (BER) associated with the second carrier,
    wherein the third SNR margin specifies a third value for an allowable increase in noise without an increase in the bit error rate (BER) associated with said first carrier,
    wherein the first SNR margin is different than the second SNR margin,
    wherein the first SNR margin is different than the third SNR margin, and
    wherein the first plurality of bits, the second plurality of bits and the third plurality of bits are each different from one another.

8. The apparatus of claim 7, wherein at least one of the first SNR margin, the second SNR margin and the third SNR margins are based at least on crosstalk or an expected crosstalk from another transmission system.

9. The apparatus of claim 7, wherein at least one of the first SNR margin, the second SNR margin and the third SNR margins are based at least on a change in temperature or an expected change in temperature.

10. The apparatus of claim 7, wherein at least one of the first SNR margin, the second SNR margin and the third SNR margins are based at least on impulse noise or expected impulse noise.

11. The apparatus of claim 7, wherein at least one of the first SNR margin, the second SNR margin and the third SNR margin is based at least on a length of a telephone line or a change in a length of a telephone line.

12. The apparatus of claim 7, wherein the apparatus is a linecard that is capable of transporting internet data.

13. The apparatus of claim 7, wherein the apparatus is a customer premises equipment that is capable of transporting internet data.

14. The apparatus of claim 7, wherein the transceiver includes at least one digital signal processor.

15. The apparatus of claim 7, wherein the transceiver includes at least one ASIC (Application-Specific Integrated circuit).

16. An apparatus comprising:
a multicarrier communications transceiver operable to demodulate for reception a first plurality of bits from a first carrier using a first Signal to Noise Ratio (SNR) margin and to demodulate for reception a second plurality of bits from a second carrier using a second SNR margin, and to demodulate for reception a third plurality of bits from the first carrier using a third SNR margin, wherein the first SNR margin specifies a first value for an allowable increase in noise without an increase in the bit error rate (BER) associated with the first carrier,
wherein the second SNR margin specifies a second value for an allowable increase in noise without an increase in the bit error rate (BER) associated with the second carrier,
wherein the third SNR margin specifies a third value for an allowable increase in noise without an increase in the bit error rate (BER) associated with said first carrier,
wherein the first SNR margin is different than the second SNR margin,
wherein the first SNR margin is different than the third SNR margin, and
wherein the first plurality of bits, the second plurality of bits and the third plurality of bits are each different from one another.

17. The apparatus of claim 16, wherein at least one of the first SNR margin, the second SNR margin and the third SNR margin is based at least on crosstalk or expected crosstalk from another transmission system.

18. The apparatus of claim 16, wherein at least one of the first SNR margin, the second SNR margin and the third SNR margin is based at least on a change in temperature or an expected change in temperature.

19. The apparatus of claim 16, wherein at least one of the first SNR margin, the second SNR margin and the third SNR margin is based at least on impulse noise or expected impulse noise.

20. The apparatus of claim 16, wherein at least one of the first SNR margin, the second SNR margin and the third SNR margin is based at least on a length of a telephone line or a change in the length of telephone wire.

21. The apparatus of claim 16, wherein the apparatus is a linecard that is capable of transporting internet data.

22. The apparatus of claim 16, wherein the apparatus is a customer premises equipment that is capable of transporting internet data.

23. The apparatus of claim 16, wherein the transceiver includes at least one digital signal processor.

24. The apparatus of claim 16, wherein the transceiver includes at least one ASIC (Application-Specific Integrated Circuit).

* * * * *